United States Patent [19]

Sekino

[11] Patent Number: 5,121,403
[45] Date of Patent: Jun. 9, 1992

[54] LIGHTING DEVICE

[75] Inventor: Takio Sekino, Iwanai, Japan

[73] Assignee: Sumitomo Metal Mining Co., Ltd., Tokyo, Japan

[21] Appl. No.: 644,551

[22] Filed: Jan. 23, 1991

[30] Foreign Application Priority Data

Feb. 1, 1990 [JP] Japan .................................. 2-22464

[51] Int. Cl.⁵ .............................................. H01S 3/093
[52] U.S. Cl. ............................................ 372/72; 372/33; 372/35; 372/99
[58] Field of Search ......................... 372/72, 99, 33, 35

[56] References Cited

U.S. PATENT DOCUMENTS

| | | | |
|---|---|---|---|
| 3,361,987 | 1/1968 | De Maria | 372/72 X |
| 4,006,431 | 2/1977 | Röss | 372/72 |
| 4,357,704 | 11/1982 | Koehner | 372/72 |
| 4,641,315 | 2/1987 | Dragoo | 372/72 |
| 4,644,555 | 2/1987 | Amaro | 372/72 |
| 4,730,324 | 3/1988 | Azad | 372/33 |
| 4,757,513 | 7/1988 | Fukae | 372/99 |

Primary Examiner—Georgia Y. Epps
Attorney, Agent, or Firm—Watson, Cole, Grindle & Watson

[57] ABSTRACT

A lighting device comprises a light source, a light reflective cylinder, and a light receiving surface receiving light directly from the light source and another light reflected from the light reflective cylinder. The light reflective cylinder has a shape such that light intensity on the light receiving surface is constant. The light source is a linear source of light. The light receiving surface has a width W and includes a flat surface extending in parallel to the optical axis of the linear source of light. The light reflective cylinder extends continuously from opposite ends of the flat surface and is composed of plates each extending in parallel to the optical axis of the linear source of light and having a very small width.

6 Claims, 6 Drawing Sheets

PRIOR ART

LIGHTING DEVICE

BACKGROUND OF THE INVENTION

1. Field of the Invention

The present invention relates to a lighting device for use in a laser system or a liquid crystal display.

2. Description of the Related Art

A conventional lighting device typically includes a light source and a light reflective cylinder and is adapted for use in a slab laser system, a liquid crystal display, and advertising or other signs.

In the prior art lighting device for use, for example, in a slab laser system, a light reflective cylinder has a semicircular, elliptical or flat surface. FIG. 6 is a sectional view of a conventional lighting device designed to actuate a slab laser system. The lighting device has a housing C within which a cylindrical Xe flash lamp or a linear source of light 2 extends in a direction normal to the surface of the drawing figure. The housing C is made of brass and has an inner surface machined to a cylindrical shape, then abraded, and plated with gold to provide a mirror surface. The housing C has a inner light reflective cylinder 3.

The housing C has an open end. A slab laser element 1, Nd:Yag, has a width W and is held in place by a Teflon thermal insulant 4 which is, in turn, fixed to the open end of the housing C. The slab laser element 1 is spaced a distance h away from the light source 2 and actuated by light from the light source 2.

FIG. 5 shows the relationship between the light source and the light intensity on the light receiving surface. In the prior art lighting device shown in FIG. 6, the origin is located on the slab laser element 1 at a point right below the light source 2. The intensity D(X) of direct light from the light source 2 onto the light receiving surface 1 at coordinates (X, 0) is represented as follows:

$$D(X) = (I/2\pi)Rd(1/\sqrt{h^2 + X^2})\cos\phi \quad (1)$$
$$= (I/2\pi)Rd(h/(h^2 + X^2))$$

where I is the light intensity of the light source 2, and Rd is reflectance of the light receiving surface 1.

From the equation (1), it is clear that in the prior art lighting device of FIG. 6, the intensity of direct light from the light source 2 onto the light receiving surface 1 decreases as the value of X increases. Although additional light or reflected light from the light reflective cylinder 3 exists, it is clear that the intensity of the reflected light is the same as that of the direct light since the light reflective cylinder has a cylindrical surface.

FIG. 4 shows the characteristic of light intensity on the light receiving surface. In the prior art lighting device shown in FIG. 6, a curve A of FIG. 4 shows the intensity of direct light from the light source 2. A curve B shows the intensity of direct light from the light source 2 plus reflected light from the light reflective cylinder 3.

In the prior art lighting device, the intensity of light on the light receiving surface is maximum at a point right below the light source 2. The intensity of light decreases as the distance between the light source 2 and the light receiving surface increases. Accordingly, the intensity of light directed onto the light receiving surface is not constant.

SUMMARY OF THE INVENTION

With the foregoing in mind, it is an object of the present invention to provide a lighting device which is capable of directing light on a surface with constant light intensity.

In order to achieve the foregoing object, there is provided a lighting device which comprises a light source, a light reflective cylinder, and a light receiving surface receiving light directly from the light source and another light reflected from the light relective cylinder. The light reflective cylinder has a shape such that light intensity on the light receiving surface is constant.

In a preferred embodiment, the light source is a linear source of light. The light receiving surface has a width W and includes a flat surface extending in parallel to the optical axis of the linear source of light. The light reflective cylinder extends continuously from ends of the light receiving surface.

The light reflective cylinder is composed of plates each extending in parallel to the optical axis of the linear source of light and having a very small width.

BRIEF DESCRIPTION OF THE DRAWINGS

A better understanding of the present invention may be had by reference to the following description of a preferred embodiment when taken in conjunction with the accompanying drawings, in which.

DESCRIPTION OF THE PREFERRED EMBODIMENT

The present invention will now be described by way of example with reference to the drawings.

Figure 1:
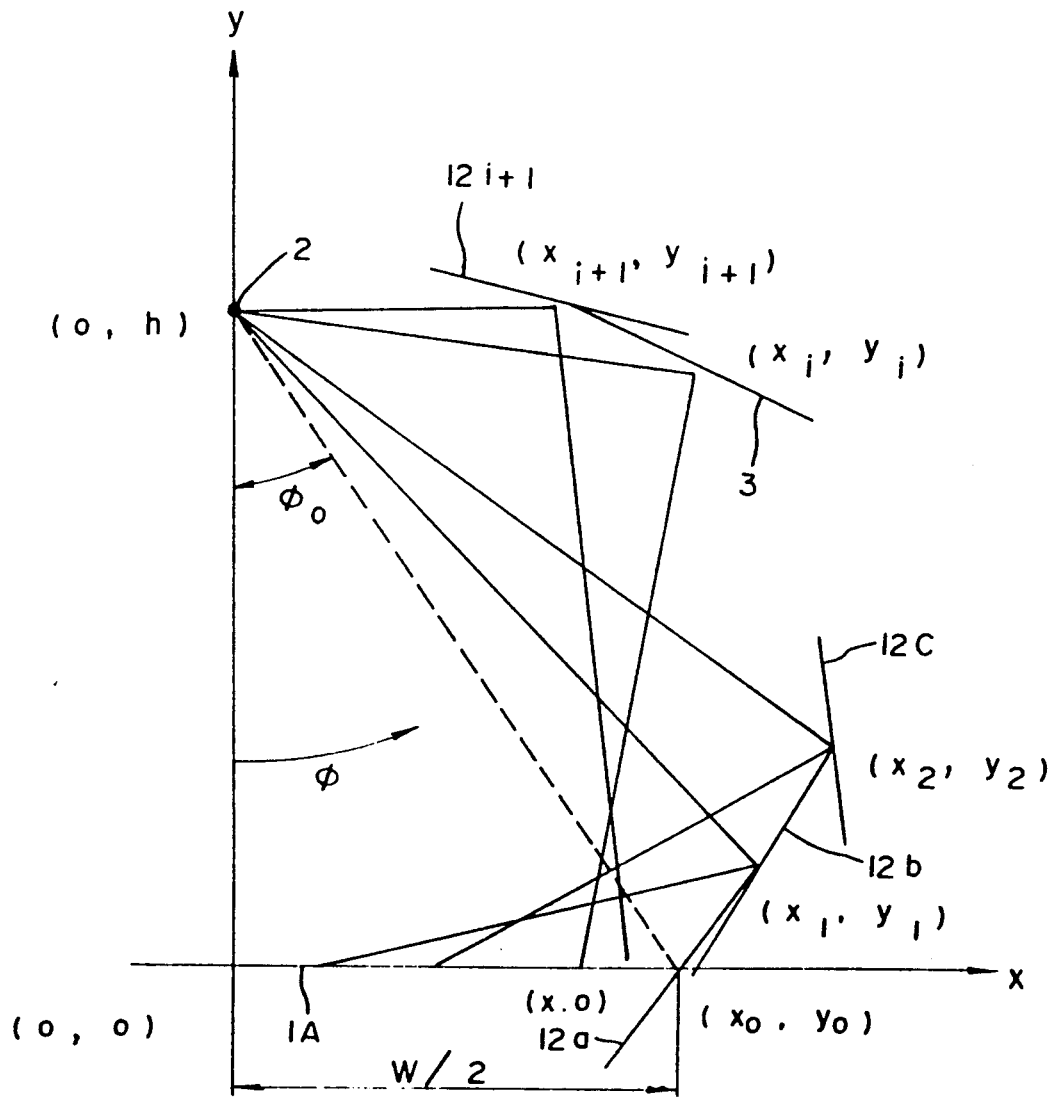
FIG. 1 illustrates the principle of a light reflective cylinder used in one embodiment of the present invention.
Figure 2:
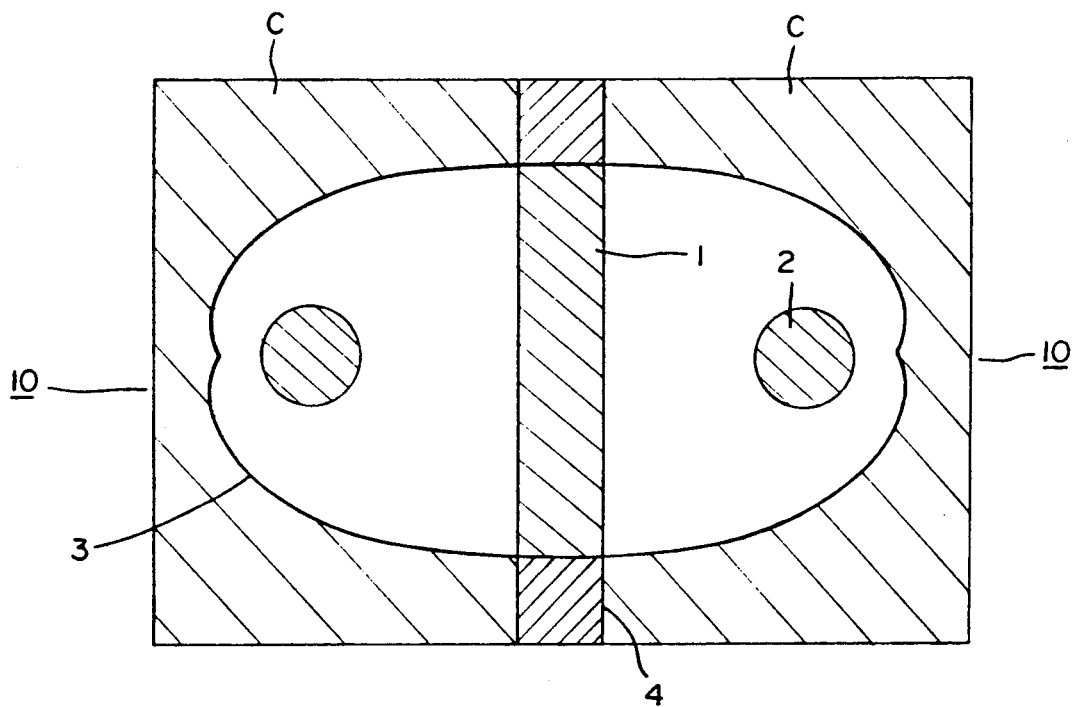
FIG. 2 is a sectional view showing the basic structure of the lighting device according to one embodiment of the present invention.
Figure 3:
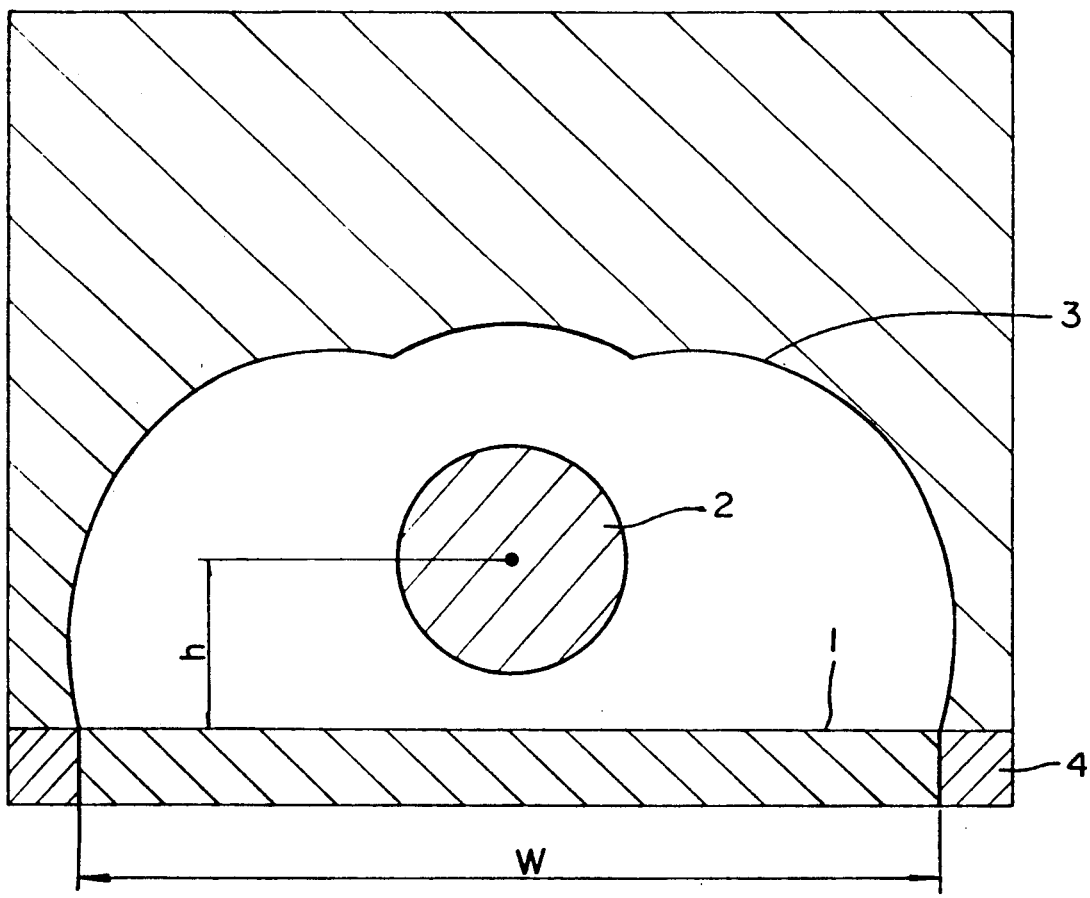
FIG. 3 is a sectional view showing the principal part of a lighting device.

FIG. 1 illustrates the principle of a light reflective cylinder used in one embodiment of the present invention. FIG. 2 is a sectional view showing the basic structure of the lighting device. FIG. 3 is a sectional view showing the principal part of the lighting device.

As shown in FIG. 2, the present invention is applied to a slab laser. A lighting device 10 includes a housing C. A slab laser element 1 is Nd:YAG and held by a Teflon thermal insulant 4. The thermal insulant 4 is a temperature distribution adjustment thermal insulant and fixed to ends of the housing C. Light is directed onto the slab laser element 1 or light receiving surface. The housing C is made of brass and has an inner surface or light reflective cylinder 3. A Xe flash lamp or light source 2 is disposed within the housing C.

Figure 5:
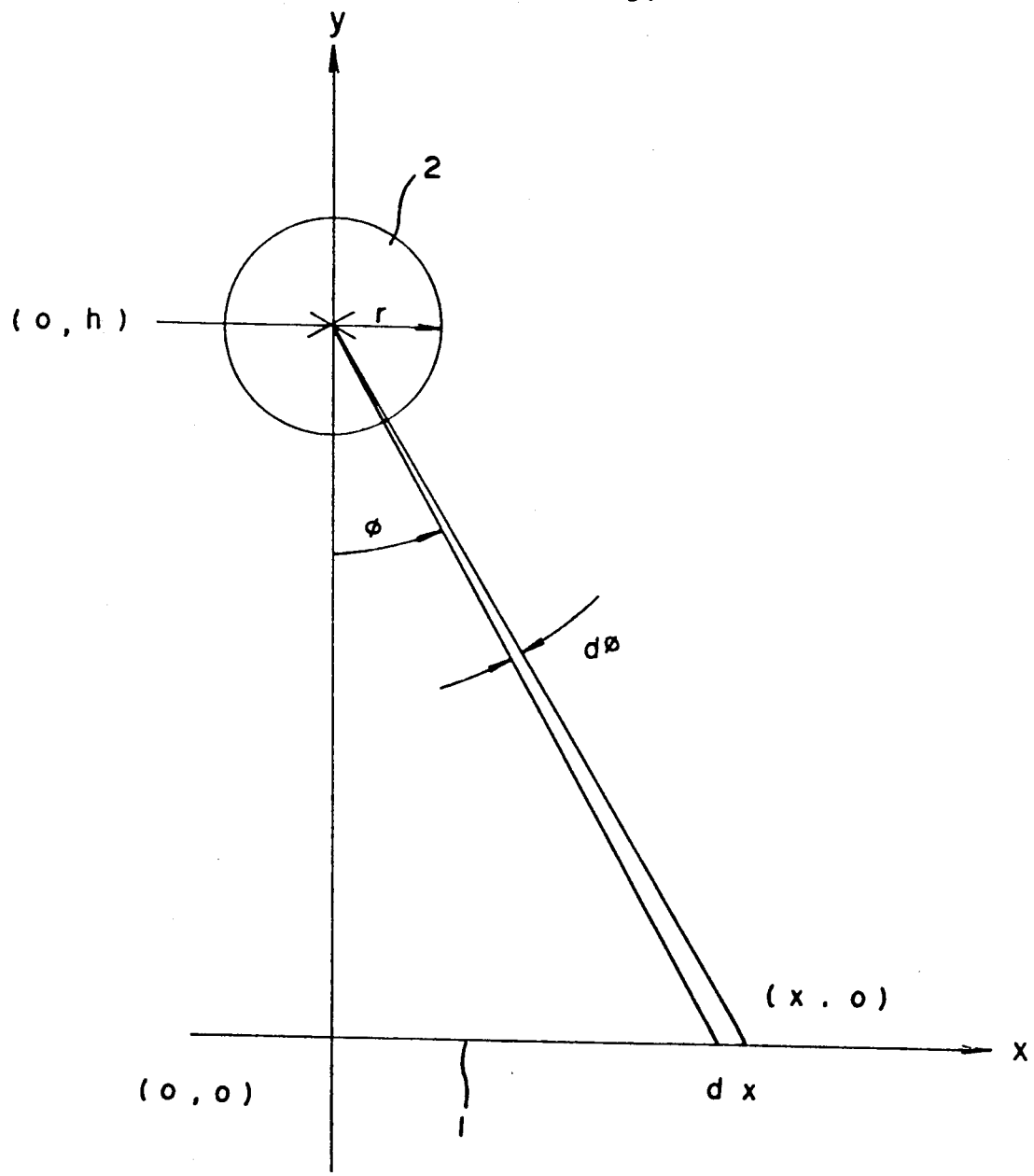
FIG. 5 is a schematic view showing the manner in which light is directed from a linear source of light to the light receiving surface.
Figure 6:
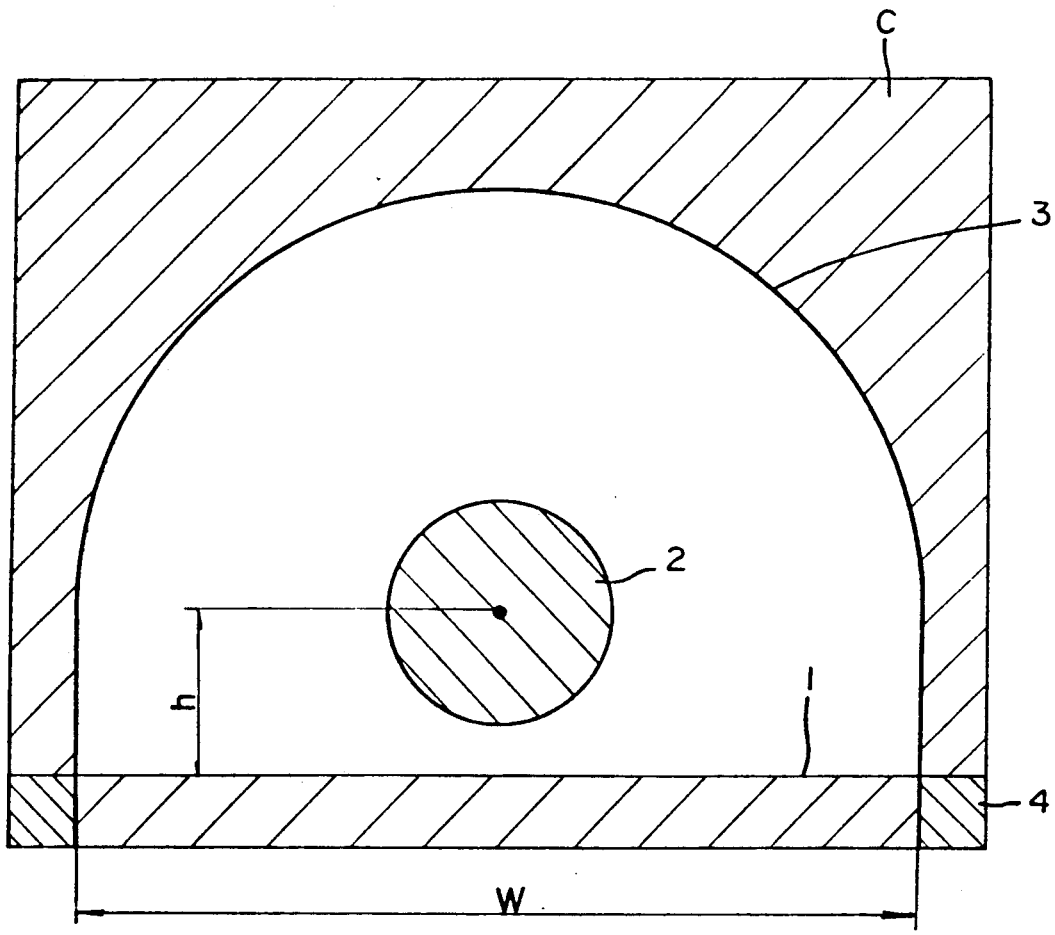
FIG. 6 is a sectional view of a conventional lighting device.

In FIG. 1, the intensity of direct light from the light source 2 onto the light receiving surface 1A, at coordinates (X, 0), is represented by the equation (1) as discussed earlier with reference to FIG. 5. Reflectance Rd of the light receiving surface 1A depends only on the angle of incidence. Thus, the reflectance Rd, together with constants I and $2\pi$, will not be considered for simplicity. The intensity $D(X)$ of direct light is represented as follows:

$$D(X) = h/(h^2 + X^2) \qquad (2)$$

The intensity of light reflected from the light reflective cylinder 3 and directed onto the light receiving surface at coordinates (X, 0) is $D_R(X)$. The total light intensity of the light receiving surface at coordinates (X, 0) is then represented as $D(X) + D_R(X)$. In order to provide substantially constant light intensity over the light receiving surface 1A, the sum of $D(X)$ and $D_R(X)$ must be equal to $1/h$ provided that the light source 2 is a linear source of light.

$$D(X) + D_R(X) = 1/h \qquad (3)$$

Therefore, $$D_R(X) = X^2/(h(h^2 + X^2)) \qquad (4)$$

In a coordinate system shown in FIG. 1, $$d\phi/dX = X^2/(h(h^2 + X^2)) \qquad (5)$$

$$\phi = X/h - \tan^{-1}(X/h) + \phi_0 \qquad (6)$$

where $\phi_0$ is a constant.

The intensity of light on the light receiving surface 1A can be substantially constant if the light reflective cylinder is formed to satisfy the equation (6) or $y = f(X)$.

With reference to FIG. 3, the light receiving surface has a width W. Opposite ends of the light receiving surface 1A is joined to the reflection surface of the light reflective cylinder 3.

As shown in FIG. 1, one end (W2, 0) of the light receiving surface 1A has coordinates ($X_0$, $Y_0$). In a coordinate system rotatable about a point (0, h), $$\phi_0 = \tan^{-1}(W/2h) \qquad (7)$$

A small reflective plate 12a has a very small width $\omega$ and coordinates ($X_0$, $Y_0$).

One end of the reflective plate 12a has coordinates ($X_1$, $Y_1$). A small reflective plate 12b of a width 107 is then joined to the one end of the reflective plate 12a and so positioned as to satisfy the equation (6).

Reflective plates are sequentially positioned in the same manner to satisfy the equation (6). These reflective plates, with coordinates ($X_0$, $Y_0$), ($X_1$, $Y_1$), ... ($X_i$, $Y_i$), ($X_{i+1}$, $Y_{i+1}$), form a continuous reflection surface of the light reflective cylinder 3.

The relationship between coordinates ($X_i$, $Y_i$) and coordinates ($X_{i+1}$, $Y_{i+1}$) can be represented as follows:

$$X_{i+1} = X_i + (\omega \sqrt{m^2 + 1})/2 \qquad (8)$$

$$Y_{i+1} = Y_i + (m\omega \sqrt{m^2 + 1})/2 \qquad (9)$$

where 107 is the width of each small reflective plate, and m is the angle of inclination of each small reflective plate.

If the equations (8) and (9) are satisfied, the light reflective cylinder 3 has a reflection surface $y = f(X)$, and the light intensity of the light receiving surface 1A is substantially constant. In the illustrated embodiment as shown in FIG. 3, the light reflective cylinder 3 is first machined by a numerical control slicer, then abraded, and plated with gold to provide a mirror surface.

The entire lighting device is symmetrical with respect to the Y-axis and has the same shape in the direction of optical axis of the light source 2 whose diameter is 8 mm. The width of the slab laser element 1 is 30 mm. The distance h between the center of the light source 2 and the slab laser element 1 is 6 mm.

Figure 4:
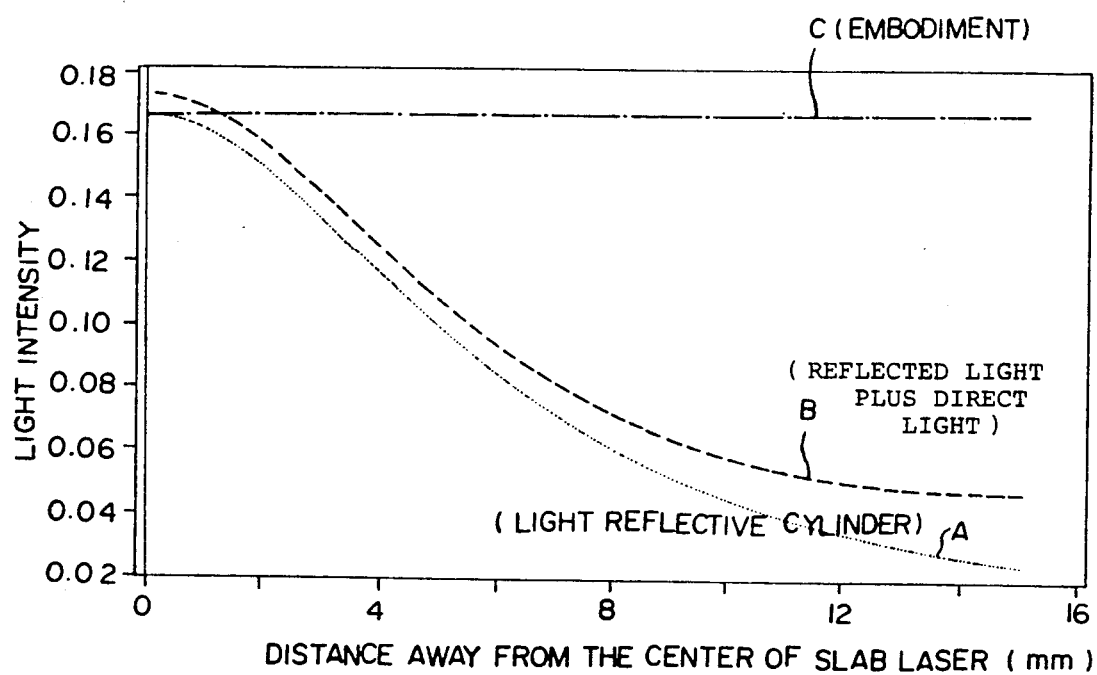
FIG. 4 shows the characteristic of light intensity on a light receiving surface in the lighting device with the light reflective cylinder.

With reference to FIG. 4, the straight interrupted line C shows the characteristic of light intensity in the embodiment as illustrated in FIG. 3. The light intensity is substantially constant at any point of the slab laser element 1.

The lighting device of the present invention provides a substantially constant light distribution over the slab laser element 1. When the present invention is applied to a liquid crystal display or advertising or other signs, the entire portion of the display or the signs can be clearly lighted.

In the illustrated embodiment, the light source is a linear source of light. The light source is not limited thereto, but may be a point source of light. In such a case, the light reflective cylinder should satisfy the equation $D(X) + D_R(X) = 1/h$ and has a three dimensional shape rotatable about the Y-axis.

The present invention thus far described is able to direct light onto the light receiving surface with substantially constant light intensity.

While the present invention has been described with respect to a specific preferred embodiment, various changes and modifications may be made therein without departing from the spirit and scope of the invention.

What is claimed is:

1. A lighting device comprising:
   a linear light source;
   a light reflective cylinder; and
   a light receiving surface receiving a light directly from said light source and light reflected from said light reflective cylinder,
   said light reflective cylinder having a shape such that light intensity on said light receiving surface is substantially constant along a width of the light receiving surface, said light receiving surface includes a flat surface extending in parallel to an optical access of said linear source of light, wherein said light reflective cylinder extends continuously from ends of said flat surface,
   said light reflective cylinder having a generally concave curved cross section in relation to the linear source of light when said cross section is taken perpendicularly to the linear source of light,
   said concave curved cross section having first and third curved sections separated by an intermediate, second curved section, the radius of curvature of the first and third sections being equal, and the radius of curvature of the second curved section being smaller than the radius of curvature of the first or third section.

2. A lighting device according to claim 1, wherein said light receiving surface includes a slab laser element.

3. A lighting device according to claim 2, wherein said slab laser element is held by Teflon thermal insulant.

4. A lighting device according to claim 1, wherein said light source is a Xe flash lamp.

5. A lighting device as in claim 1, wherein the light reflective cylinder satisfies the equation:

$$\phi = X/h - \tan^{-1}(X/h) - \phi_0$$

wherein $\phi$: is an angle formed by an ordiante (Y) and a straight line connecting a point (0,h) on the ordinate (Y) with a desired point on an abscissa (X);

X: is a desired coordinate on the abscissa (X)

h: is a distance between the surface of a slab laser element defined by the abscissa (X) and a center of the light source; and $\phi$: is a constant which may be represented by
$$\phi = \tan^{-1}(W/2h)$$
wherein W is a width of the slab laser element.

6. A lighting device as in claim 1, further comprising an additional light source and light reflective cylinder opposite said light receiving surface.

* * * * *